(12) United States Patent
Lin

(10) Patent No.: US 8,696,014 B2
(45) Date of Patent: Apr. 15, 2014

(54) PUSH CART WITH EXPANDABLE LOAD-CARRYING AREA

(75) Inventor: Paul Lin, Tainan (TW)

(73) Assignee: Macauto Industrial Co., Ltd., Tainan (TW)

( * ) Notice: Subject to any disclaimer, the term of this patent is extended or adjusted under 35 U.S.C. 154(b) by 0 days.

(21) Appl. No.: 13/552,026

(22) Filed: Jul. 18, 2012

(65) Prior Publication Data

US 2014/0021699 A1  Jan. 23, 2014

(30) Foreign Application Priority Data

Mar. 22, 2012  (TW) .............................. 101205191 A

(51) Int. Cl.
*B62B 1/00* (2006.01)
(52) U.S. Cl.
USPC ........... 280/638; 280/35; 280/659; 280/43.12
(58) Field of Classification Search
None
See application file for complete search history.

(56) References Cited

U.S. PATENT DOCUMENTS

| | | | |
|---|---|---|---|
| 6,511,092 B1 * | 1/2003 | Chepa | 280/656 |
| 6,889,587 B2 * | 5/2005 | Neal | 83/347 |
| 6,966,574 B1 * | 11/2005 | Dahl | 280/651 |
| 7,490,847 B2 * | 2/2009 | Dahl | 280/638 |

* cited by examiner

*Primary Examiner* — John Walters
*Assistant Examiner* — James Triggs
(74) *Attorney, Agent, or Firm* — Whyte Hirschboeck Dudek S.C.

(57) ABSTRACT

A push cart having an expansion unit for expanding load-carrying surface includes a movable cart frame, a load-carrying plate, an expansion unit and a coupling mechanism. The load-carrying plate is installed on the cart frame. The expansion unit includes at least one expansion plate. The coupling mechanism includes at least one coupling unit for detachably coupling the expansion plate to one side of the load-carrying plate. The coupling unit includes a female component disposed in one of the load-carrying plate and the expansion plate and a male component disposed on the other one of the load-carrying plate and the expansion plate for mating engagement with the female component.

5 Claims, 4 Drawing Sheets

PUSH CART WITH EXPANDABLE LOAD-CARRYING AREA

BACKGROUND OF THE INVENTION

1. Field of the Invention

The present invention relates to a push cart having an expansion unit for expanding a load-carrying area thereof.

2. Description of the Related Art

A push cart generally includes a cart body having wheels and a load-carrying plate fixedly installed on the cart body. During use, loads are placed on a load-carrying surface of the load-carrying plate and wheels at the bottom of the push cart facilitate the cart in moving those loads around.

The design of a push cart varies in that different widths of load-carrying plate are used for different countries. For example in crowded regions of Japan, in order for a push cart to pass through narrow passages, the load-carrying plate of a push cart should not exceed a certain width. On the other hand, less crowded regions of Europe may permit use of a load-carrying plate having a larger width. In other words, different sizes of load-carrying plates are used for manufacturing push carts of different dimensions that suit the living conditions in different countries.

However, manufacturing load-carrying plates of different dimensions for push carts creates inconvenience for manufacturers. Not only that, it also creates inconvenience for users. For instance, a load-carrying plate of smaller width carries a smaller amount of load at once, while a load-carrying plate of a larger width is more likely to be obstructed by surrounding objects when it is being pushed around. Therefore, push carts having a fixed dimension of load-carrying plate create inconvenience for both manufacturers and users.

SUMMARY OF THE INVENTION

The object of the present invention is to provide a push cart having an expansion unit for expanding a load-carrying area thereof.

According to the present invention, a push cart comprises:
a movable cart frame;
a load-carrying plate installed on the cart frame;
an expansion unit including at least one expansion plate; and
a coupling mechanism including at least one coupling unit for detachably coupling the expansion plate to one side of the load-carrying plate, the coupling unit including a female component disposed in one of the load-carrying plate and the expansion plate and a male component disposed on the other one of the load-carrying plate and the expansion plate for mating engagement with the female component.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
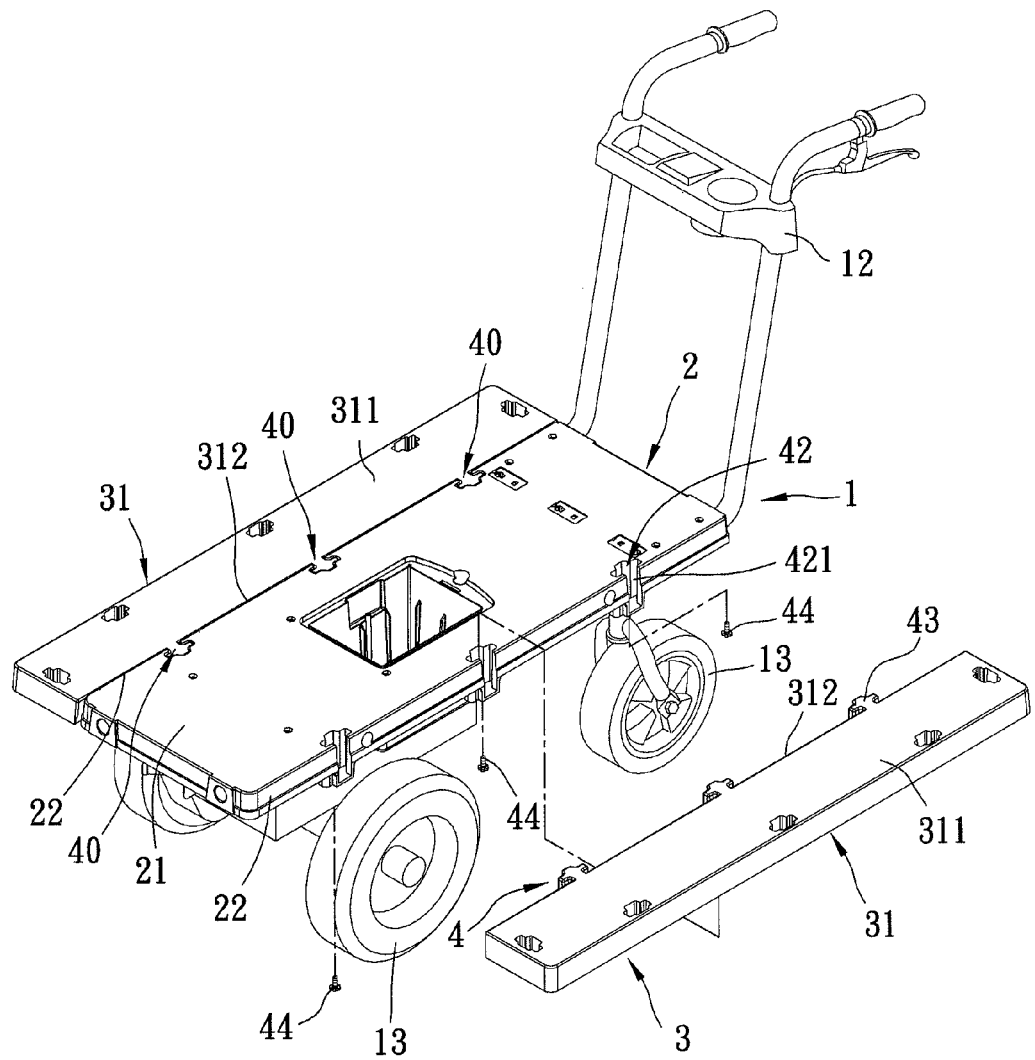
FIG. 1 is an exploded perspective view of the push cart of the preferred embodiment of the present invention.
Figure 2:
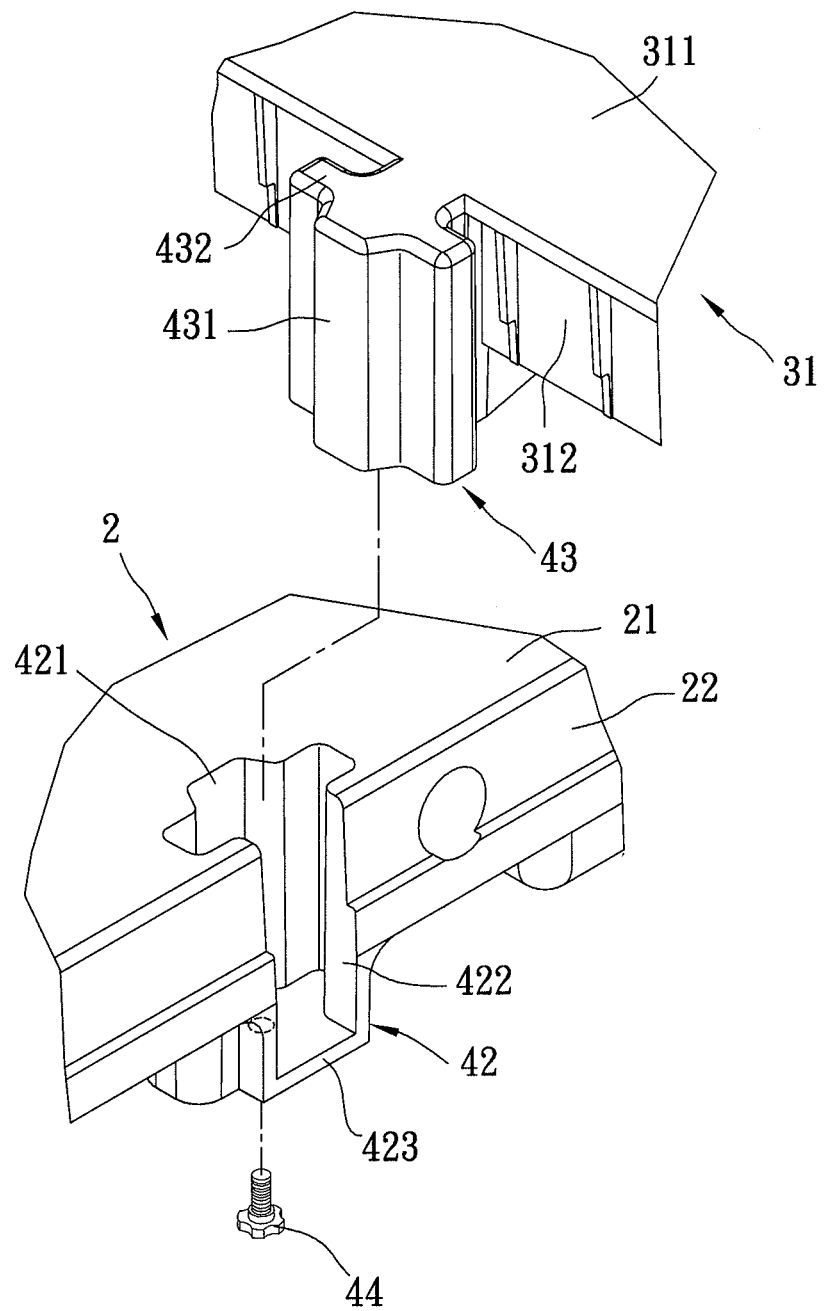
FIG. 2 is a fragmentary exploded perspective view of the preferred embodiment illustrating a coupling unit of the push cart.
Figure 3:
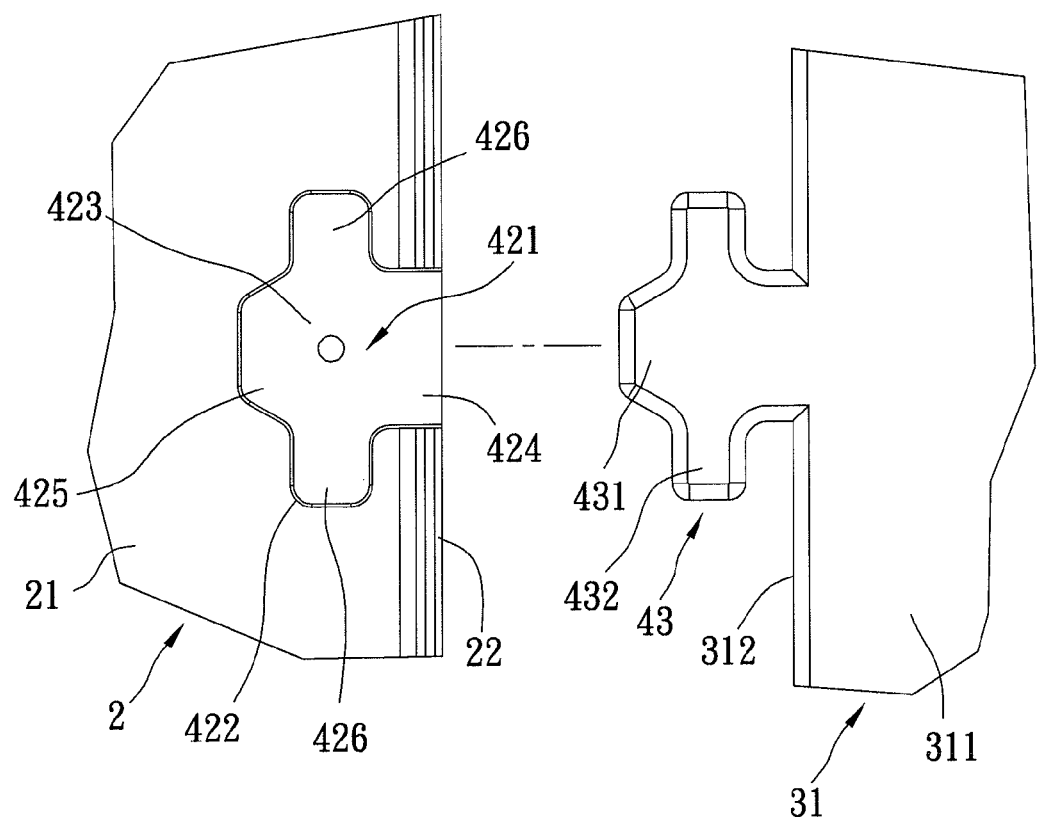
FIG. 3 is a fragmentary planar exploded schematic view of the preferred embodiment illustrating the coupling unit.

Referring to FIGS. 1, 2 and 3, a push cart according to a preferred embodiment of the present invention includes a movable cart frame 1, a load-carrying plate 2 installed on the cart frame 1; an expansion unit 3, and a coupling mechanism 4 for detachably coupling the expansion unit 3 to the load-carrying plate 2. The movable cart frame 1 includes a push portion 12 and a plurality of cart wheels 13 located at the bottom of the movable cart frame 1. Since the feature of the invention does not reside in the specific configuration of the cart frame, further details thereof are omitted herein for the sake of brevity.

The load-carrying plate 2 is a unitary body of a plastic material having high structural strength, and includes a load surface 21, and two side surfaces 22 that extend downward from two opposite lateral sides of the load surface 21.

In this preferred embodiment, the expansion unit 3 includes two expansion plates 31 that are detachably coupled to two opposite sides of the load-carrying plate 2, respectively. Each of the expansion plates 31 has a horizontal first surface 311 and a second surface 312 that extend substantially extends downward from the first surface 311. The second surface 312 is disposed to abut against one of the side surfaces 22 of the load-carrying plate 2.

In this preferred embodiment, the coupling mechanism 4 includes a plurality of coupling units 40 for detachably coupling the expansion plates 31 to opposite sides of the load-carrying plate 2. Preferably, a set of three coupling units 40 is disposed on each side of the load-carrying plate 2 and is aligned with the other set of three coupling units 40 on the opposite side of the load-carrying plate 2.

In this preferred embodiment, each coupling unit 40 includes a female component 42 disposed in the load-carrying plate 2, a male component 43 disposed on the expansion plate 31, and a fastening component 44. The female component 42 is an engaging groove 421 cooperatively defined by a surrounding wall 422 and a bottom wall 423. From a perspective view, the engaging groove 421 is generally cross-shaped, and has an opening 424, a first recess region 425 extending from the opening 424, and two second recess regions 426 extending from opposite lateral sides of the first recess region 425. The male component 43 is an engaging block that has a first protrusion portion 431 detachably received in the first recess region 425 and the opening 424 and that has a second protrusion portion 432 intersecting the first protrusion portion 431 and detachably received in the second recess regions 426. Preferably, the fastening component 44 is a screw for removably fastening the bottom wall 423 of the female component 42 to the male component 43, as best shown in FIG. 4.

Figure 4:
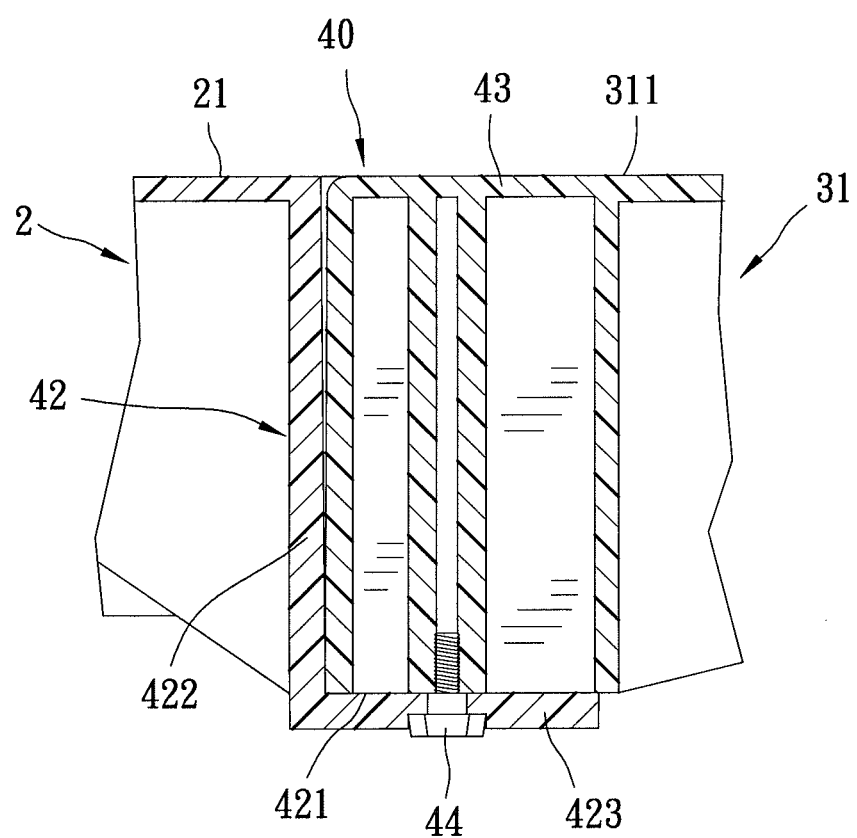
FIG. 4 is a fragmentary assembled sectional view illustrating the coupling unit.

Referring to FIGS. 1, 2 and 4, when assembling the push cart, the expansion plates 31 are installed on two opposite sides of the load-carrying plate 2, i.e., the male components 43 of the coupling units 40 are inserted into their respective engaging grooves 421. To prevent external forces from destabilizing the load-carrying plate 2 and the expansion plates 31 installed thereon, the fastening components 44 are used to removably fasten the female components 42 to the male components 43. After installation, the first surface 311 of the expansion plates 31 is flush with the load surface 21 of the load-carrying plate 2 to provide an even surface for convenience of loading objects.

According to the above, when making push carts, load-carrying plates 2 are manufactured in one size, and then expansion plates 31 are optionally installed on both sides of the load-carrying plate 2 to suit different customer requirements.

From users' standpoint, the expansion plates 31 can be easily assembled or disassembled from the load-carrying plate 2 simply by installing or uninstalling the fastening components 44. Therefore, the expansion plates 31 can be installed to carry more load at once or uninstalled to pass through narrow passage routes. As a result, user convenience is significantly improved as the cart's dimension can be modified to suit different conditions.

Optionally, a single expansion plate 31 instead of two can also be used to expand load-carrying area. The female component 42 can be formed on one of the load-carrying plate 2 and the expansion plate 31 and the male component 43 can be formed on the other one of the load-carrying plate 2 and the expansion plate 31. Preferably, the female component 42 is formed in the load-carrying plate 2 instead of the expansion plate 31 to prevent having protrusions on the load-carrying plate 2 when the push cart is used without any expansion plate 31.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A push cart comprising:
   a movable cart frame;
   a load-carrying plate installed on said cart frame;
   an expansion unit including two expansion plates that are detachably coupled to two opposite sides of said load-carrying plate respectively; and
   a coupling mechanism including a plurality of coupling units for detachably coupling said expansion plates to said opposite sides of said load-carrying plate, each of said coupling units including a female component disposed in one of said load-carrying plate and said expansion plate and a male component disposed on the other one of said load-carrying plate and said expansion plate for mating engagement with said female component;
   wherein said female component is an engaging groove cooperatively defined by a surrounding wall and a bottom wall said engaging groove having an opening, a first recess region extending from said opening, and two second recess regions extending from opposite lateral sides of said first recess region; and
   wherein said mail component is an engaging block having a first protrusion portion detachably received in said first recess region and said opening and a second protrusion portion intersecting said first protrusion portion and detachably received in said second recess regions.

2. The push cart as claimed in claim 1, wherein each of said coupling units further includes a fastening component to removably fasten said bottom wall to said male component.

3. The push cart as claimed in claim 1, wherein said second protrusion portion is substantially orthogonal to said first protrusion portion.

4. The push cart as claimed in claim 1, wherein said load-carrying plate has two opposite side surfaces, and said female components are disposed to extend from said side surfaces of said load-carrying plate.

5. The push cart as claimed in claim 1, wherein said load-carrying plate has two opposite side surfaces and a load surface interconnecting said side surfaces, and each of said expansion plates has a first surface flush with said load surface and a second surface disposed to abut against one of said side surfaces of said load-carrying plate.

* * * * *